(12) United States Patent
De Cuyper et al.

(10) Patent No.: US 10,828,814 B2
(45) Date of Patent: Nov. 10, 2020

(54) OVERMOULDING METHOD FOR PREFORMS TO BE CONVERTED INTO CONTAINERS AND DEVICE THEREFOR

(71) Applicant: Resilux NV, Wetteren (BE)

(72) Inventors: Dirk De Cuyper, Destelbergen (BE); William Dierickx, Destelbergen (BE)

(73) Assignee: Resilux NV, Wetteren (BE)

( * ) Notice: Subject to any disclaimer, the term of this patent is extended or adjusted under 35 U.S.C. 154(b) by 754 days.

(21) Appl. No.: 14/648,736

(22) PCT Filed: Dec. 2, 2013

(86) PCT No.: PCT/BE2013/000062
§ 371 (c)(1),
(2) Date: Jun. 1, 2015

(87) PCT Pub. No.: WO2014/082140
PCT Pub. Date: Jun. 5, 2014

(65) Prior Publication Data
US 2015/0314503 A1 Nov. 5, 2015

(30) Foreign Application Priority Data

Nov. 30, 2012 (BE) .................................. 2012/0813

(51) Int. Cl.
*B29C 45/16* (2006.01)
*B29C 45/42* (2006.01)
(Continued)

(52) U.S. Cl.
CPC ........ *B29C 45/162* (2013.01); *B29C 45/1625* (2013.01); *B29C 45/4225* (2013.01);
(Continued)

(58) Field of Classification Search
None
See application file for complete search history.

(56) References Cited

U.S. PATENT DOCUMENTS

2004/0151937 A1   8/2004   Hutchinson
2005/0158494 A1*  7/2005   Koyama ................. B32B 27/08
                                                    428/35.7
(Continued)

FOREIGN PATENT DOCUMENTS

DE     19856356 A1    6/2000
EP      1970181 A1    9/2008
(Continued)

*Primary Examiner* — Matthew J Daniels
*Assistant Examiner* — Mohammad M Ameen
(74) *Attorney, Agent, or Firm* — James Creighton Wray

(57) ABSTRACT

Method for manufacturing plastic preforms (10) by injection moulding, consisting of sub-preforms (11, 12) injected at the same time, wherein (Φ1) the injection mould (3) containing the injected composite preform (10) and secondary sub-preform (12) is 1 st closed, and a gripper (4) provided with a set of receiving members (16) is set in a standby position (A) aside from the mould (3); in a 2nd step (Φ2) the mould (3) is opened, wherein each primary core (33) bears an injected composite preform (10), and the secondary core (33') a secondary inner preform (12); the gripper (4) is then driven (Φ3) in motion between the standby position (A) and a take-over position (B), wherein the injected preforms (10, 12) are cooled and taken over from the core side (31) by the gripper (4) by means of suction means (6); wherein the gripper (4) is further moved (Φ4) into a further operating position (C), in which it places the received secondary inner preforms (12) onto the respective primary cores (33) and continues to hold said preforms (11), with formation of integrated preforms (10) which are expelled to a discharge unit.

10 Claims, 13 Drawing Sheets

(51) Int. Cl.
  *B29K 67/00* (2006.01)
  *B29K 105/00* (2006.01)
  *B29C 45/72* (2006.01)
  *B29L 9/00* (2006.01)

(52) U.S. Cl.
  CPC ............... *B29B 2911/1402* (2013.01); *B29B 2911/1408* (2013.01); *B29B 2911/1414* (2013.01); *B29B 2911/14026* (2013.01); *B29B 2911/14093* (2013.01); *B29C 2045/1621* (2013.01); *B29C 2045/7214* (2013.01); *B29K 2067/003* (2013.01); *B29K 2105/0032* (2013.01); *B29K 2105/253* (2013.01); *B29K 2105/258* (2013.01); *B29K 2995/0021* (2013.01); *B29K 2995/0026* (2013.01); *B29L 2009/00* (2013.01); *Y10T 428/1397* (2015.01)

(56) References Cited

U.S. PATENT DOCUMENTS

| 2005/0170113 | A1* | 8/2005 | Hill | B29C 45/1684 |
| | | | | 428/35.7 |
| 2008/0241447 | A1 | 10/2008 | Shi | |
| 2010/0092711 | A1 | 4/2010 | Atance Orden | |
| 2010/0307633 | A1* | 12/2010 | Dierickx | B29B 11/14 |
| | | | | 141/1 |

FOREIGN PATENT DOCUMENTS

| JP | H04-296520 | * | 10/1992 | |
| JP | H04296520 | A | 10/1992 | |
| JP | 2004082622 | A | 3/2004 | |
| WO | 9416871 | A1 | 8/1994 | |
| WO | WO-9416871 | A1 * | 8/1994 | ........... B29C 45/372 |
| WO | 2007128085 | A2 | 11/2007 | |

* cited by examiner

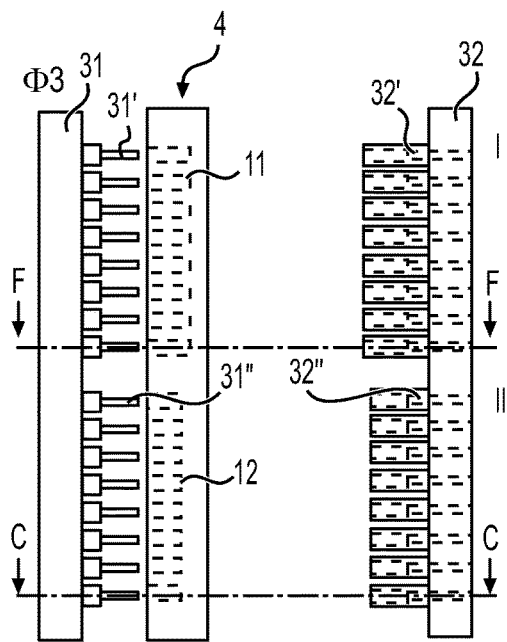
FIG. 9
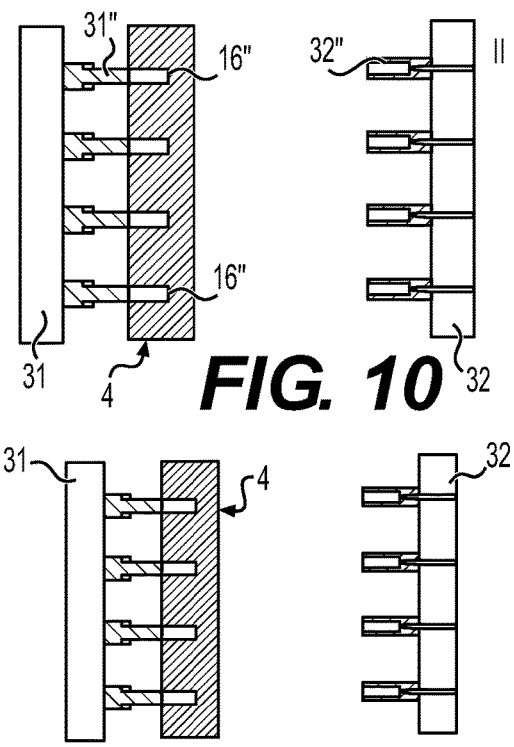
FIG. 10
FIG. 12
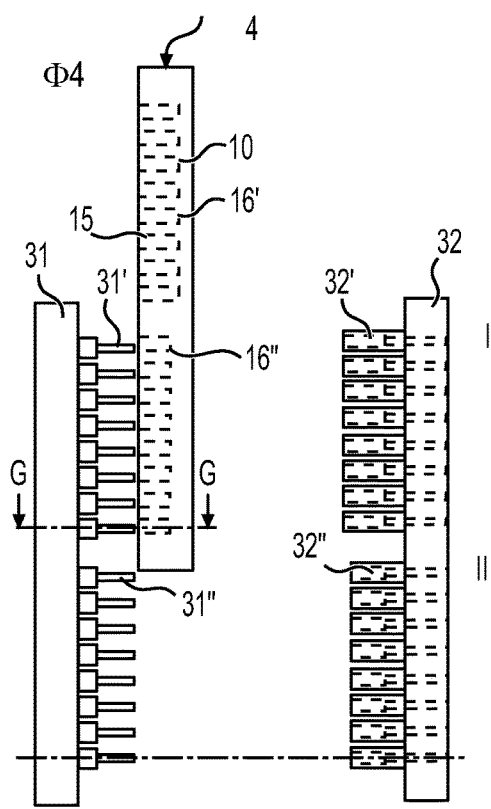
FIG. 11
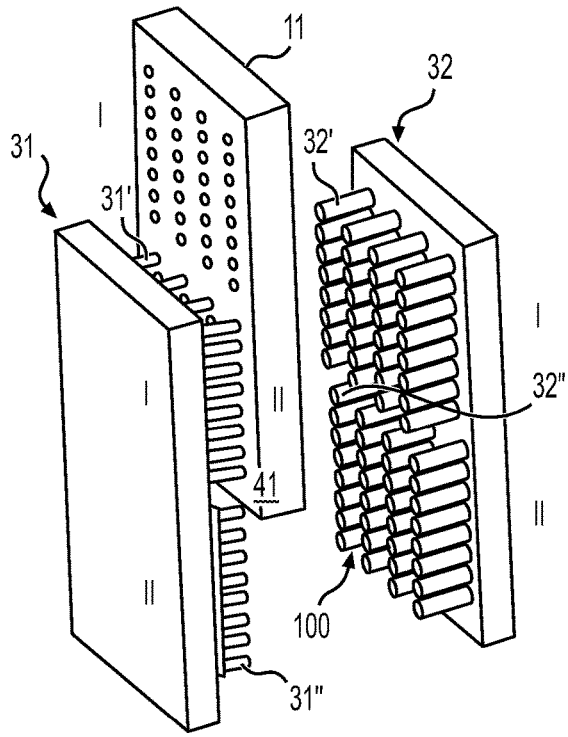
FIG. 13A

US 10,828,814 B2

OVERMOULDING METHOD FOR PREFORMS TO BE CONVERTED INTO CONTAINERS AND DEVICE THEREFOR

FIELD OF THE INVENTION

The invention relates to overmoulding consisting in a technique for use in injection moulding, wherein in a $1^{st}$ phase an injection moulded plastics product is inserted into a cavity of an injection mould, is mounted on a core thereof, and wherein in a $2^{nd}$ phase another product is injected over or around the first inserted product.

It is started herein with a method for producing plastics preforms by injection moulding, intended for working into plastics containers. Primary raw material for the production of a preform is injected into a mould having a cavity side and a core side, between which the preform is formed. After this, the mould is opened into its two halves—cavity side and core side—wherein each core of the core side bears a preform.

BACKGROUND OF THE INVENTION

For preforms, overmoulding constitutes an interesting technique to be adopted when the preform needs a very high light barrier, such as in containers for dairy products. In this case, an inner preform is made of a material which is light-tight or opaque, whilst a corresponding outer preform is made which is transparent or has a colour. As described in PCT/BE2007/000040, when blowing the preform into a milk bottle, it is white on the outer side, whilst on the inner side, there is a black or grey layer of plastic which produces the light barrier. An extrusion coating process of overmoulding could be used here, consisting in producing preforms to begin with the injection moulding of the grey inner layer, over which a $2^{nd}$ white layer is further sprayed. This guarantees the light barrier which is required with ultra-high temperature (UHT) milk bottles.

The overmoulding preform and the bottle blown therefrom can also be used however for other fields of application, such as in case of gas-tight, moisture-tight or chemical barriers requirements.

A method exists in which the inner preform, as the first injected product, is transferred to the cavity/core of the outer preform, as the product yet to be injected, by means of a transport and transfer system incorporated in the mould. Although this system offers an advantage as regards cycle time, it also has a good many drawbacks.

US 2005/0249902 A1 concerns the compression of overmoulded preforms for containers, in which a compression injection moulding production method for a two-layer preform is disclosed. This technique is unrelated, however, to an overmoulding injection moulding process involving a stretching and blowing technique.

In EP 1970181 of Minera Catalano-Aragonesa, a two-layer preform produced by an overmoulding technique is described. The preform comprises two layers, which each consist of a composition of polyethylene terephthalate (PET), titanium dioxide ($TiO_2$) and a dye with light-absorbing capacity in the visible light spectrum. However, neither a specific preparation method nor an elaborate overmoulding technique is proposed.

US 2010/0092711 of MOLMASA APLICACIONES TECNICAS, S.L. discloses a method and mould for producing a two-layer preform by overmoulding which differ considerably from the invention below, however, both in terms of mould design and of the course of the production method. Firstly, the technique and the mould which are described therein use the same core for injection into both the primary and secondary mould cavities, which calls for a vertical displacement of both the cavity side and the core side of the mould.

Secondly, this technique makes use of alternate primary and secondary cavities. Although this reduces the amount of vertical movement which is necessary to effect transfer of the primary preforms, this also implies, however, a more complex hot runner system having alternate nozzles for the primary and secondary material respectively. A drawback of this known system is that investment needs to be made in a new non-standard machine, a special mould using an as yet unknown technology, and a good deal of peripheral equipment.

It is further known that there are currently limits on the output of the production system, notably no higher than 24-fold, which, in itself, is a limitation for the output, so that an increase in this is eagerly awaited. In case the requested number of products to be made is large, several such systems must be purchased, which entails additional costs. This system also operates with moving parts in a mould which is particularly complex, so that this is very prone to wear as a result of these moving parts.

PRIOR ART

Document JP-HO4-296520-A describes the manufacturing of composite materials, wherein as a first step an injection moulding part is formed in a first cavity, in a second step another material is pressed over this injection moulding part with a press, and in a third step a next injection moulding part is added thereto. In this method, a pressing technique is thus adopted, which by no means fits into the process which is referred to here.

Document WO 94/16871-A1 describes only the use of two robot arms for the production of PET preforms, which is simply regarded here as a specific application in the production of overmoulding preforms, without any contribution being made to the overmoulding technique which is aimed at here, per se.

In document DE-198 56 356-A1, a method is also described for the production of overmoulding preforms, for which, however, a mould with rotating core side is utilized, and wherein the injected product remains constantly on the same core and is placed into another cavity. However, this is completely opposite to the system meant here, wherein it is precisely intended to make the mould components move as little as possible, especially in a rotary direction, for the sake of preventing wearing thereof.

Document US2004/151937-A1 discloses a mould for the injection moulding of PET preforms, wherein the neck and cavity consist of a material having a different thermal conductivity in order to obtain a different cooling. This falls completely outside the application to the method which is referred to here.

Document JP-2004 082622-A has no relation to preforms, which constitutes though the basic intermediate product whose production is specifically meant here, in particular for the production of containers, with its thereto associated specifies.

Finally, document JP-H04296520 of MITSUBISHI Heavy IND neither discloses a process for preforms nor does it mention the injection moulding technique therein, in contrast with the present invention wherein no other technique is presently envisaged. Moreover, according to this document, an initial injection is made and that so injected product is brought to the bottom, and only then is a second injection made, in contrast to the present intention from now on to proceed to inject both simultaneously. Furthermore, the process is conducted from top to bottom here. There is a priori only one cavity and core visible on the drawings, wherein the whole system as described appears geared to one single cavity, resp. core.

AIM OF THE INVENTION

The object of this invention consists in providing another overmoulding method, with which a solution is brought to the aforementioned problems, and the aforementioned drawbacks and/or deficiencies are remedied.

SUMMARY OF THE INVENTION

To this end, an insert overmoulding method of the abovementioned type is proposed according to the invention, in which plastics preforms intended for working into containers are produced. According to a basic embodiment of the method of the invention, it is remarkable in that the plastics preform is made with an integrated added inner preform. The raw material for the production of the composite preform and the added inner preform is injected into a mould having a cavity side and a core side corresponding thereto, all at the same time both for the primary and the secondary preform, though not from the same composite. In a $1^{st}$ step, the injection mould containing the injected products is closed, whilst a gripping member on which a set of receiving members are fitted is brought into a set-aside standby position A.

In a $2^{nd}$ step, the mould is opened in its cavity side resp. core side, wherein on the core side the cores for the composite preform—these being the primary cores—and the cores for the added inner preform—these being the secondary core—each bear an injected product, namely a composite resp. secondary preform.

In a $3^{rd}$ step, the gripping member is set in motion, under the drive of a custom-made drive unit, according to a preset direction of displacement between the set-aside standby position A, in which said gripping member is inactive and stands ready for onward movement, and an operating position B directed at the core side of the mould. The injected and cooled products are received in the gripping member by means of suction means, wherein each product is received in a receiving member corresponding thereto.

In a $4^{th}$ step, the gripping member is moved into a further operating position C and places the received added secondary inner preforms onto the primary cores, and keeps holding said preforms. After placing the secondary conjugated preforms onto these primary cores, the gripping member reverts to said set-aside standby position A in order to deliver the assembled composite preforms with an integrated added inner preform, to the outlet of the system for further treatment for the conditioning thereof. The cycle is then recommenced from the $1^{st}$ step, whereby the mould is reclosed.

In this case, only the injection moulding technique is adopted, limited to plastics preforms instead of hollow articles, and no other technique. Both primary and secondary preforms are injected simultaneously, with the incorporation of a suitable hot runner system.

The mould which is used in the system is of relatively simple construction, like existing moulds which are readily available, thus yielding less complexity. After all, there are no moving parts, and thus no displacements, in the mould, thereby causing less wear herein. As a result, the whole system becomes cheaper, whilst machinery and peripheral equipment can be used for the standard preforms.

All these characteristics according to the invention constitute valuable advantages thereof.

It is also endeavoured according to this invention to shift this complexity from the mould to the deployed robot which cooperates therewith, bearing in mind that the robot is visible from the outside and is directly accessible—which is also more manageable in the event of maintenance or repair—in contrast to the mould. By virtue of this, the production process can be better controlled, especially visually, so that this readily also becomes more reliable, at least for the applications intended here. By virtue of the use of existing (standard) machines, this results in greater flexibility as a result of maintained standardization.

According to an advantageous embodiment of the present invention, a primary core, with which injection is made into the primary cavity, is also used, whilst a secondary core is used for injection into the secondary cavity. Following the first injection step, the secondary preform is removed from the secondary cavity by an advantageously robotized grab arm, it is transported vertically and it is placed onto the primary core. This means that the vertical movement which is necessary to displace the secondary preform from the secondary core to the primary core takes place without movement of the cavity side or core side of the mould. This precludes any movements of the heavy and complex mould sides, which simplifies the process, prevents excessive wearing of the mould and allows the use of standard machines.

Furthermore, no use is made in this invention of alternate primary and secondary cavities, which implies a more complex hot runner system indeed having alternate nozzles for the primary and secondary material, respectively. In the proposed invention, on the contrary, all primary cavities and cores can advantageously be grouped together in a dedicated subfield of the mould, namely a secondary field, in particular the bottommost part thereof, and all secondary cavities and cores in another sub-field of the mould, namely a primary field, in particular the topmost part, or possibly vice versa.

According to an alternative embodiment of the present invention, the primary and secondary sub-fields of each mould side are organized in a matrix pattern in a predefined number of rows and columns respectively containing an equal number of elements, just as for the thereto corresponding primary and secondary sub-fields of the gripping member. This subtends a higher number of cavities, in particular 32-fold, even extending up to 64 and above, being preferably an exponent of 2 starting from the power rank 5, if need be, even 48- or 96-fold.

In a further embodiment of the method according to the invention, in a sequential representation of overmoulding, the injection mould is closed in Ø1, in step Ø2 the mould is opened, in step Ø3 the aforementioned grab arm is displaced between both mould halves in which said products are received, and in step Ø4 the bottommost products are placed onto topmost cores by this one grab arm.

In an additional embodiment of the method according to the invention, said grab arm is provided with a vacuum plate as the receiving member for the take-up of injection moulded products consisting of said preforms, wherein the relevant mould plate constitutes the movable side having a predefined number of cores, intended for a set of primary resp. secondary preforms, and a corresponding number of cores for the secondary preforms alone, which each occupy virtually their dedicated half of the plate surface on the core side of the mould, more particularly on the top half and the bottom half. The mould plate constituting the fixed side has a corresponding number of cavities for the primary preforms and a further set having a still corresponding number of cavities intended for the secondary preforms, which occupy the other half of the plate surface, in particular the remaining bottom half.

Thus in step 1, the one mould half serves as the movable side with the cores thereon, opposite to the other mould half, which serves as the fixed side, in which the cavities also are, wherein the finished products are injected and are located between the relevant cores and cavities.

According to a further aspect of the basis embodiment of the method of the invention, in the following step 2 thereof, the mould is opened, and the movable mould half opposite to the fixed mould half is removed in parallel therefrom. The top products in the top half constitute the outer preforms. The inner preforms are received therein, with the formation of a finished product through the combination of a top product and an inner preform, wherein the bottom products present in the bottom half constitute the inner preforms.

According to a still further aspect of the embodiment of the method according to the invention, in the third step thereof, the grab arm with the vacuum plate, which was in the standby position, is moved vertically downwards into position C and the products are transferred from the cores to the vacuum plate.

According to a still further aspect of the embodiment of the method according to the invention, in the fourth step of the method, the grab arm with the vacuum plate is moved vertically upward with the injection moulded products, whereupon the bottom products, being the inner preforms, are transferred onto the topmost cores.

According to a still further aspect of the embodiment of the method according to the invention, the robot arm is then further displaced vertically upwards, with the aforementioned number of top products therein, wherein these are then expelled from the vacuum plate and are hence finally ready for packing. The procedure is conducted from bottom to top here, i.e. the other way round compared to the known procedure.

According to a transitional embodiment of the method according to the invention, as soon as the robot arm disappears from between the mould, the mould is closed again as in step Ø1 and it is thus made ready to injection-mould a following series of products, being the integrated composite preforms at the top and a corresponding number of inner preforms at the bottom.

According to a privileged embodiment of a method according to the invention, at least 1 second gripping member is used, which is displaced under the drive of a second drive unit, the latter being in particular coordinated with the first drive unit, between the aforementioned position B and the operating position C, wherein these gripping members are coordinated with one another for the mutual successive takeover and discharge of the shaped preforms.

According to a specific embodiment of a method according to the invention, the gripping members are displaced according to a to-and-fro movement in the direction of their respective longitudinal axes Y1, Y2, wherein the gripping members are fitted above the mould and their respective movement with respect to each other is time-lagged, particularly wherein the time shift is adjustable, more particularly as a function of the number of rows of cores and cavities respectively.

In a particular embodiment of the method according to the invention, the aforementioned at least two gripping members are mounted on a support according to a mounting plane virtually perpendicular to the ground, and are displaced in this mounting plane, according to a second direction, under the drive of a further drive unit, between a standby position A and the decoupled operating position B.

According to a more particular embodiment of a method according to the invention, the at least 2 gripping members are successively displaced according to two directions virtually at right angles to each other, wherein the first motional direction is chosen virtually vertical to the ground and both gripping members are moved between said position B and operating position C.

According to a yet more particular embodiment of a method according to the invention, a first cooling time is set for the cooling, in the cavity side, of the injected preforms. Following expiry of the set first cooling time, the cavity side and the core side of the mould are removed from each other up to a mutual distance apart which is sufficient to allow one of the aforementioned gripping members to be introduced into a thus formed space between the cavity side and the core side, wherein the take-up side of the aforementioned one gripping member is directed towards the core side, one gripping member is displaced from said position B to said space, and the aforementioned one gripping member is thus brought into operating position C with respect to the core side. The preforms are cooled there in the respectively corresponding receiving members for a second set cooling time and, following expiry of the aforementioned cooling time, the preforms are passed from the core side facing one gripping member into respectively a receiving member corresponding to each core. After this, one gripping member is brought back into position B, both gripping members are shifted transversely until the further gripping member is brought into position B, and one gripping member is brought into said standby position A; subsequently, the movement executed by the aforementioned one gripping member during the completed cycle is executed analogously by the further gripping member, and thus, a further set of preforms is taken over by the latter from the core side of the mould and the further gripping member is then driven back into position B.

According to a still more particular embodiment of a method according to the invention, during a first cycle said mould opens after expiry of a first cooling time, injected preforms standing on the core side. Once a space is formed between the core side and the cavity side, which space is sufficiently large to allow the first gripping member to be placed therein with a reliable transference of the preforms, said first gripping member is displaced under the drive of a motor constituting the said drive unit, along the longitudinal axis Y1 of said first gripping member between the said core side and the cavity side until it stands in the operating position C. The first gripping member then takes over a complete first set of preforms from the core side. After the preforms are transferred, the first gripping member is led back along the longitudinal axis Y1 to position B, in which the preforms are held in respective sleeves, constituting the receiving elements, of the first gripping member during a following cycle O2 which commences from the moment when the first gripping member is brought into position B. The preforms are accommodated in their respective sleeves, where they are subjected to a suitable cooling, wherein the preforms of the first cycle O1 are meanwhile still present in the second gripping member. Shortly before the end of the following cycle O2, the second gripping member is displaced from the standby position A into position B, whilst the first gripping member is displaced into a standby position A' with an analogous takeover process which is executed with the second gripping member. After the said first gripping member has reached the position B, preforms are removed, and the abovementioned steps are repeated for the following cycle $O_n$ in a repeat process.

In a still more particular embodiment of the method according to the invention, this movement of both gripping members runs at the same time in the aforementioned second direction X, where the supporting plate is displaced under the drive of a further motor constituting the further drive unit.

This invention further also relates to a device which is especially intended for the implementation of a method as set out above, comprising a mould for the forming of the preforms, which mould has mutually detachable cavity and core sides, on which a number of protruding cores are fitted for the holding of preforms, and to a gripping member provided with a set of receiving members, which can be directed at the cores, for the cooling and reception of the preforms. The gripping member is movable, under the drive of a drive unit, between a decoupled position B and an operating position C, the gripping member being coupled with the core side. This is notable by virtue of the fact that at least one second gripping member is provided, which is equipped with a further set of receiving members with which the cores of the core side of the mould can be aligned. The said at least second gripping member is movable, under the drive of a further drive unit, between the said decoupled position B and the operating position C, wherein this gripping member is coupled with the core side and the movement can be coordinated with that of the first gripping member.

According to a further embodiment of a device according to the invention, each gripping member is formed by a grab arm, wherein the receiving elements are constituted by sleeves, in which the cavity side of the mould is situated on a fixed machine platform, wherein the core side is fixed on a displaceable platform of the machine, and wherein a core puller is provided, which has a detaining effect on the preforms remaining on the respective cores of the core side, by way of a locally applied clamping connection.

According to a particular embodiment of a device according to the invention, two supporting plates or tables are provided, each having a gripping member with separate control.

In summary, by virtue of the special set-up of standard elements according to the invention, which are used according to defined method steps, it is possible to operate in a simplified, and all in all, less complex manner. The system according to the invention consists in dividing a standard mould, in particular 64-fold, into two fairly equal halves, i.e. 32 bottom parts for the inner preforms and 32 top parts for the outer preforms, or possibly vice versa.

It must be clear that this is not limited to plastics preforms as semi-finished products, but also embraces hollow articles as the end products. In addition, it will also be clear that the robot arm, apart from the above-described vertical movement for displacing the injection moulding parts, can also make a horizontal movement in order to place the secondary injection moulding part into the primary cavity.

Further particularities and features of the invention are defined in the further sub-claims.

The method and apparatus of the invention are further illustrated by the appended drawings, wherein further details are explained in more detail in the following description in some embodiments of the invention with reference to the attached drawings.

BRIEF DESCRIPTION OF THE DRAWINGS

In addition, FIG. 9 shows the third phase of the method according to the invention, wherein the grab arm with the vacuum plate, which was in the standby position, now receives all products from the cores.

FIG. 10 is a sectional representation along the line C-C in the previous FIG. 9, showing a cross section, wherein the bottommost 32 products, being the inner preforms, are transferred into the vacuum plate.

FIG. 11 schematically represents the fourth step of the method according to the invention, wherein the grab arm moves upwards with the vacuum plate with the injection moulded products.

In addition, FIG. 12 shows a cross section along the line G-G in the previous FIG. 11, wherein the injection moulded inner preforms are on the topmost cores.

FIGS. 13A and 13B represent 3D perspective views of a detail of the mould components.

FIGS. 28A and 28B to 35 show a combined application of overmoulding and coating on a preform, thereby including zebra states.

DESCRIPTION

Figure 1A:
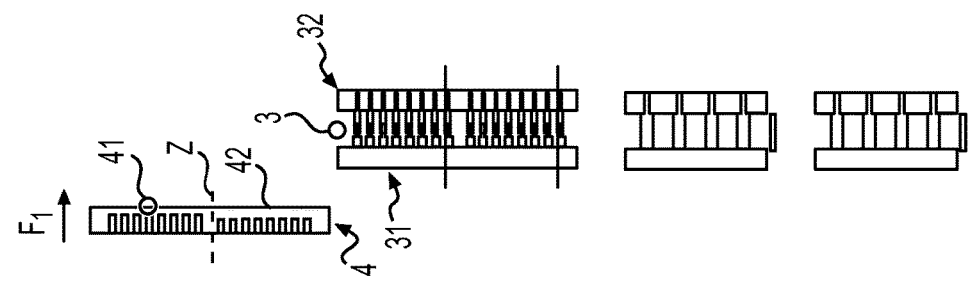
FIGS. 1A, 1B, 1C and 1D are general sequential representations of an overmoulding cycle of a main embodiment of the method according to the invention.
Figure 1B:
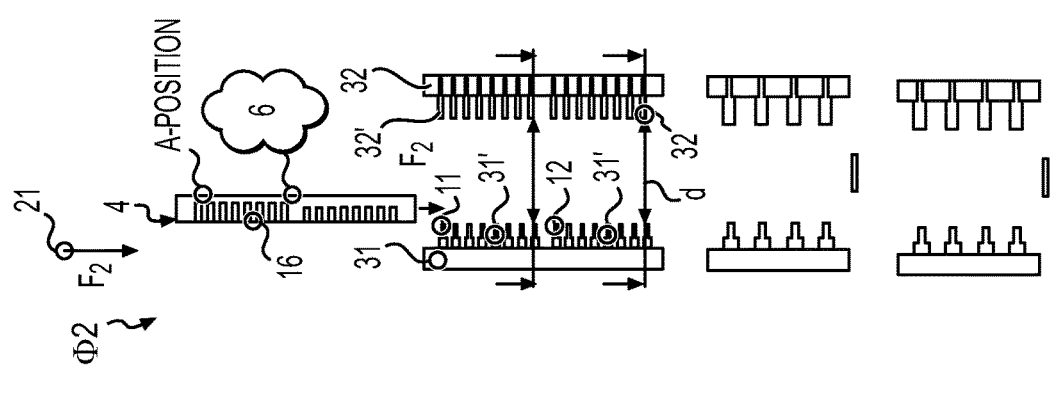
Figure 1C:
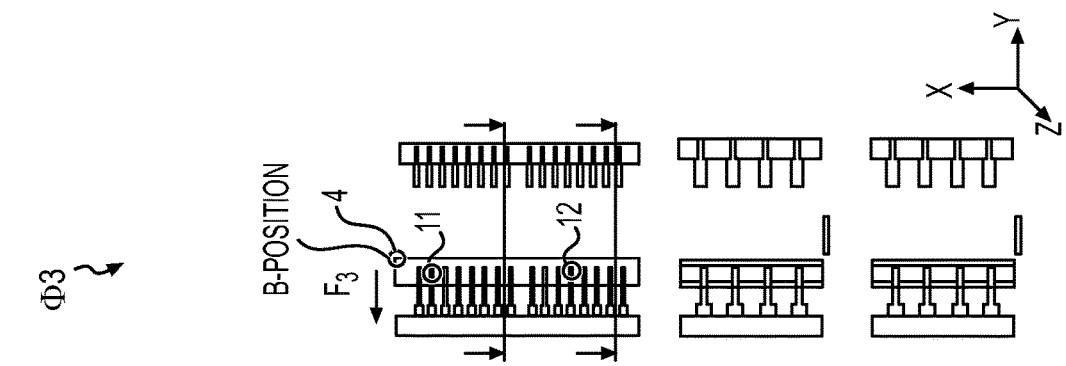
Figure 1D:
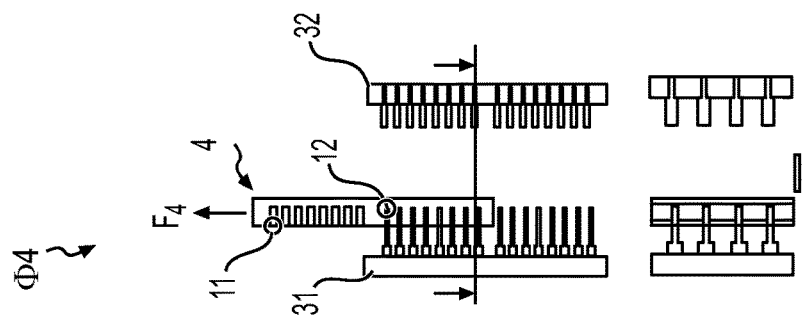

FIG. 1 shows in partial views a to d a general sequential representation of overmoulding with, in Φ1, an injection mould 3 which is closed; in Φ2, the mould which is opened into its 2 mould halves, 31 as the core side and 32 as the cavity side; in Φ3, a grab arm 4, which arrives therebetween and receives products 11, 12, and finally, in Φ4, the grab arm 4, which places bottommost products 12 onto topmost cores 31'.

Figure 2:
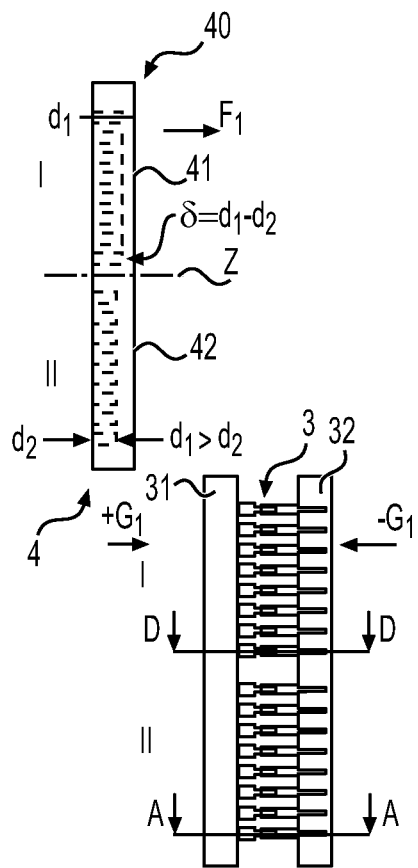
FIG. 2 shows step 1 of the method, wherein the mould is closed and the grab arm is in a standby position.

FIG. 2 shows said one grab arm 4, which is provided with a vacuum plate 40 for the reception of injection moulded products 11, 12. Opposite thereto, the relevant mould plate 31, constituting the movable side, is depicted, having for example 32 cores intended for the composite preforms 10 and 32 cores for the inner preforms 12, which each occupy virtually half of the plate surface, in this case on the top half. The mould plate 32, constituting the fixed side, correspondingly has 32 cavities for the composite preform and a further set of 32 cavities intended for the inner preform, which occupy the other half of the plate surface, in this case the bottom half.

Figure 3:
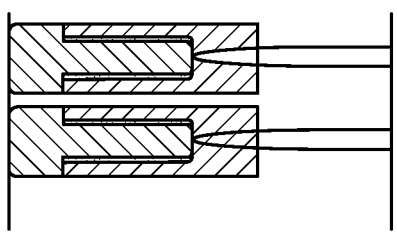
FIG. 3 is a cross section along the line D-D of the device represented in the previous FIG. 2.

FIG. 3 shows the mould 3, closed in step 1 of the method, in the closed state, and the grab arm 4 in a standby position.

Figure 4:
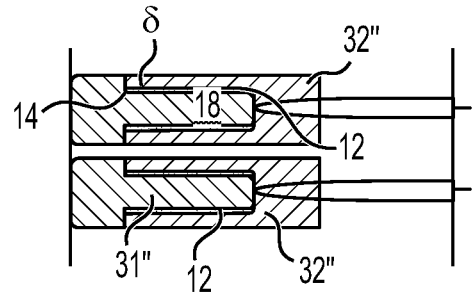
FIG. 4 is an analogous representation to the previous FIG. 3, consisting in a cross-sectional view through the line A-A, though in this case with regard to the inner preform as the finished product.

In FIG. 4, the mould plate is represented as the movable side 31 opposite the mould plate represented as the fixed side 32, in which the cavities for the composite preform 10 are also depicted, in which the core is incorporated therefor, with therebetween the finished composite preform 10 with injected inner preform 12.

Figure 5:
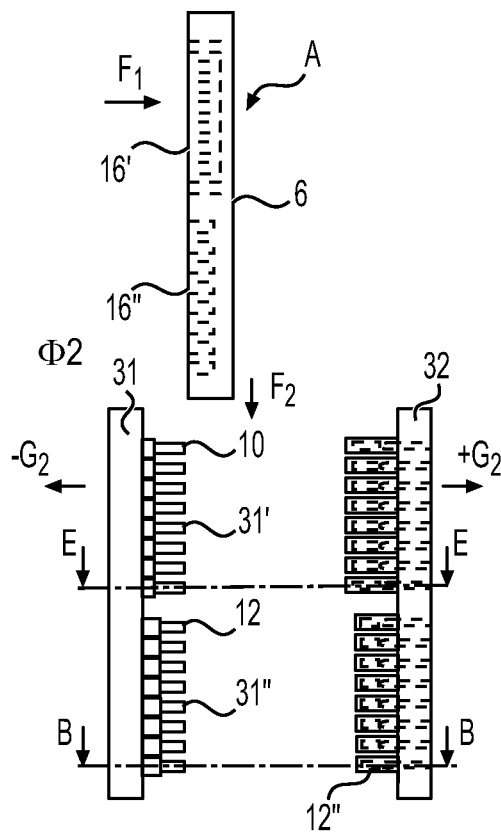
FIG. 5 represents the following phase or step 2, wherein the mould is opened.

FIG. 5 is an analogous representation to the previous FIG. 4, consisting in a cross-sectional view through the line A-A, though in this case with regard to the inner preform 12 as the finished product.

Figure 6:
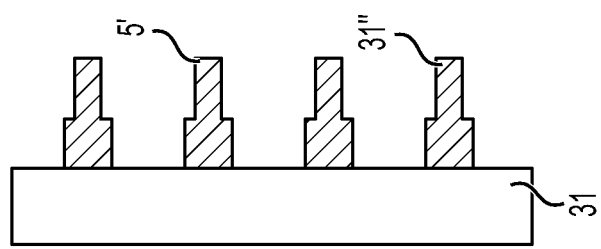
FIG. 6 represents a section along the line E-E in the previous FIG. 5, on which the topmost 32 products constitute the composite preforms, with inner preforms.
Figure 6:
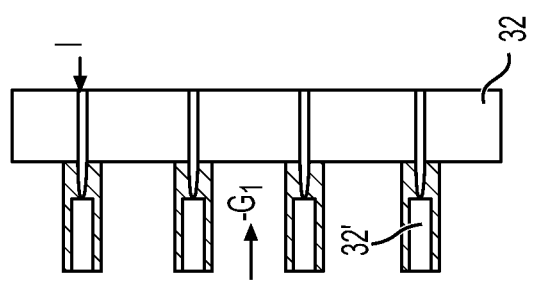

FIG. 6 represents the following phase 2, wherein the mould 3 is opened, in particular with a section along the line E-E in the previous FIG., on which the topmost 32 products constitute the composite preforms 10, with inner preforms.

Figure 7:
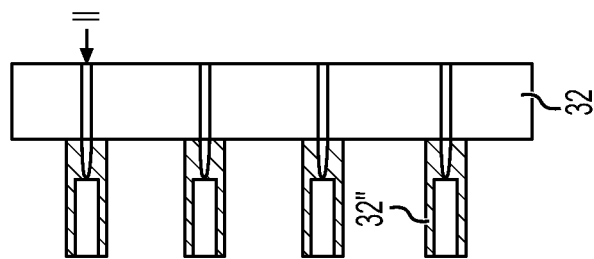
FIG. 7 is an analogous representation to the previous FIG. 6, though of a section along the line B-B, with representation of the bottommost 32 products, which only represent the 32 inner preforms.

FIG. 7 is an analogous representation to the previous FIG., though of a section along the line B-B, with representation of the bottommost 32 products, which represent only the 32 inner preforms.

Figure 8:
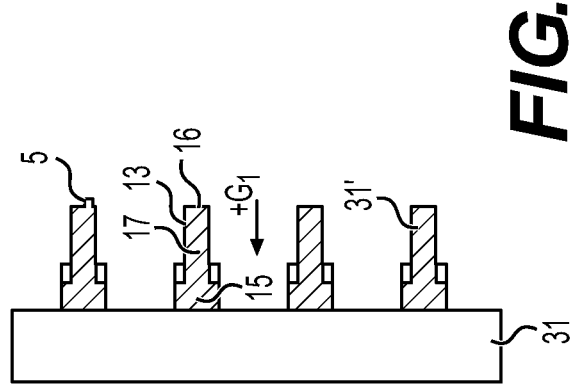
FIG. 8 is a schematic representation of the thus formed finished product, consisting of the aforementioned composite preforms, in which the inner preform is accommodated.
Figure 13B:
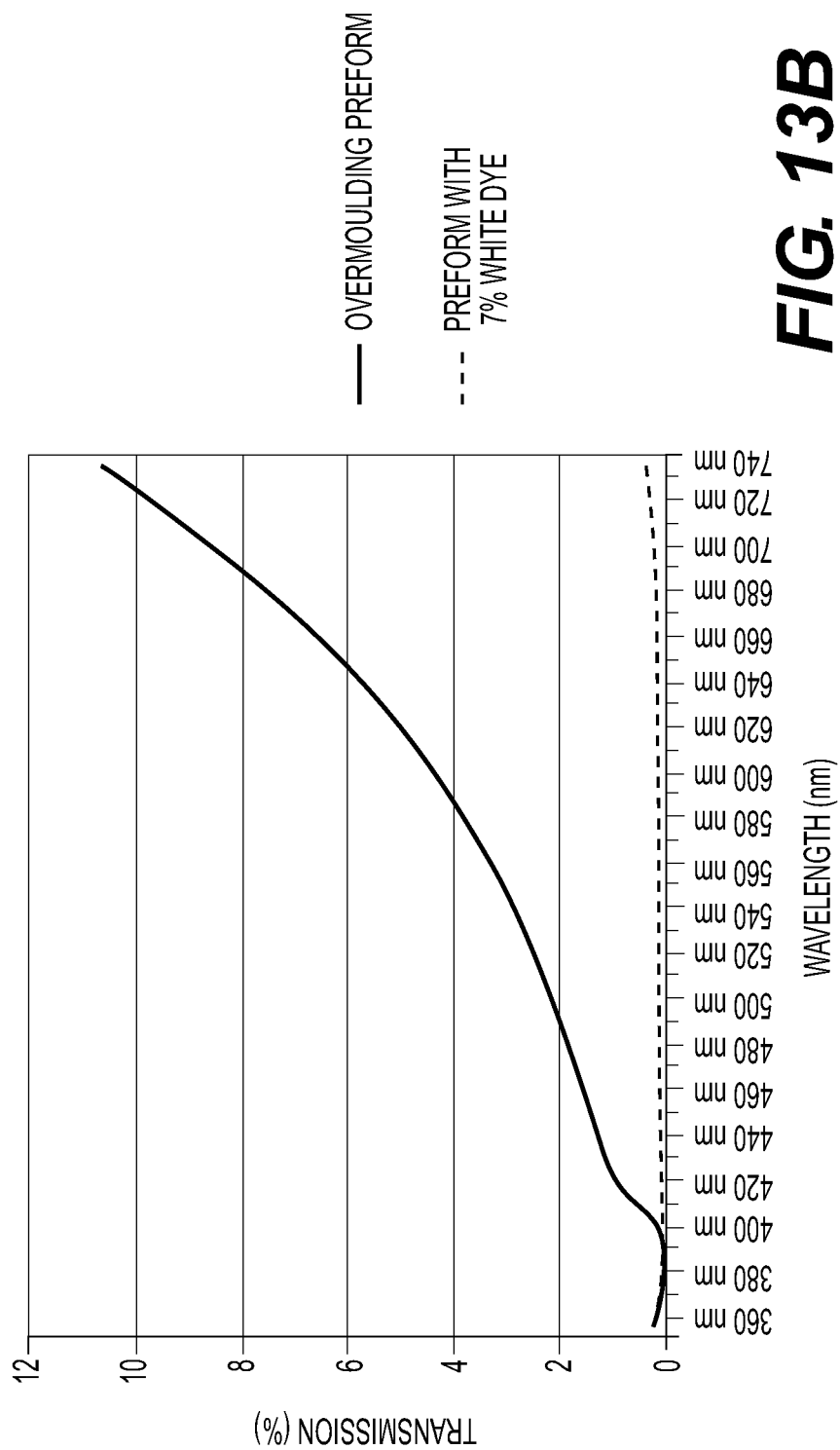
Figure 15:
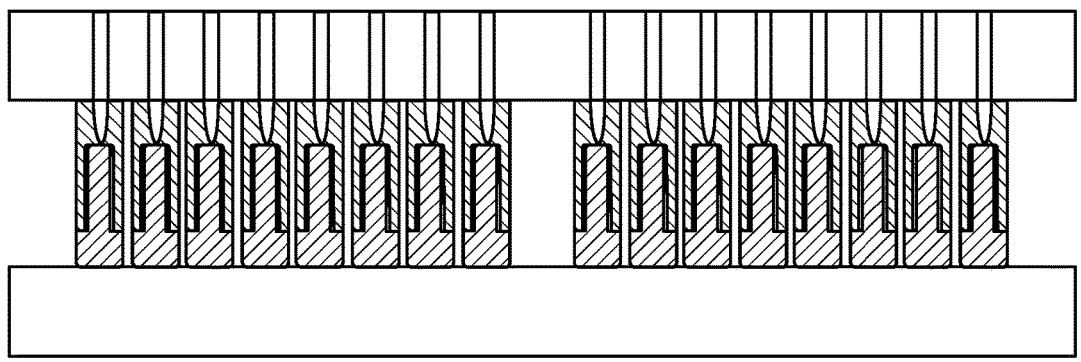
FIG. 15 represents a detail in enlarged view from FIGS. 1 & 2 respectively.
Figure 14:
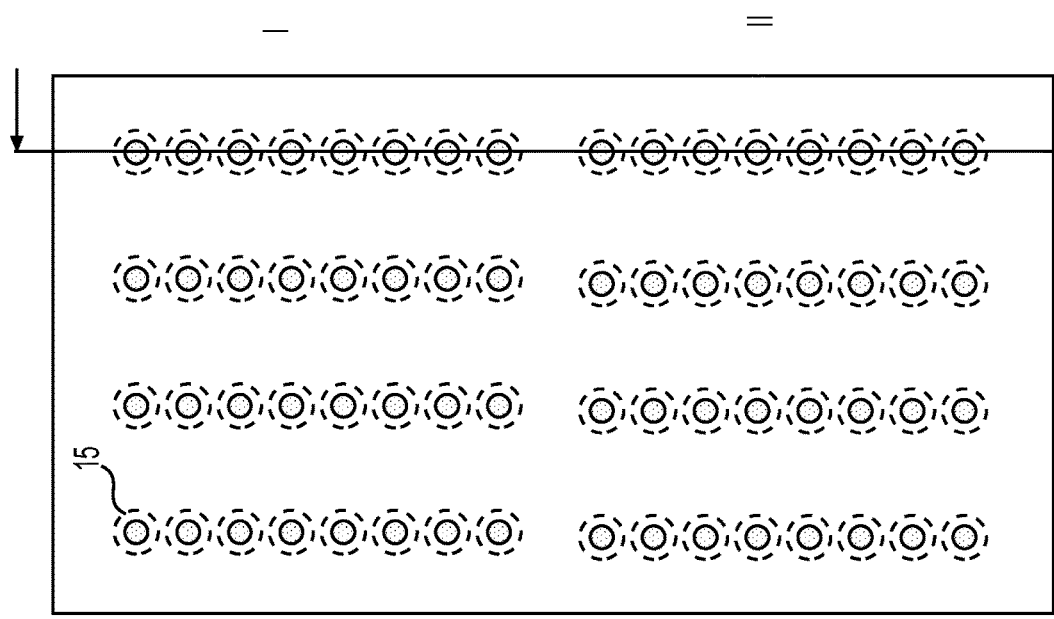
FIG. 14 represents a front view of a detail of the mould components according to the previous FIG. 13.
Figure 16:
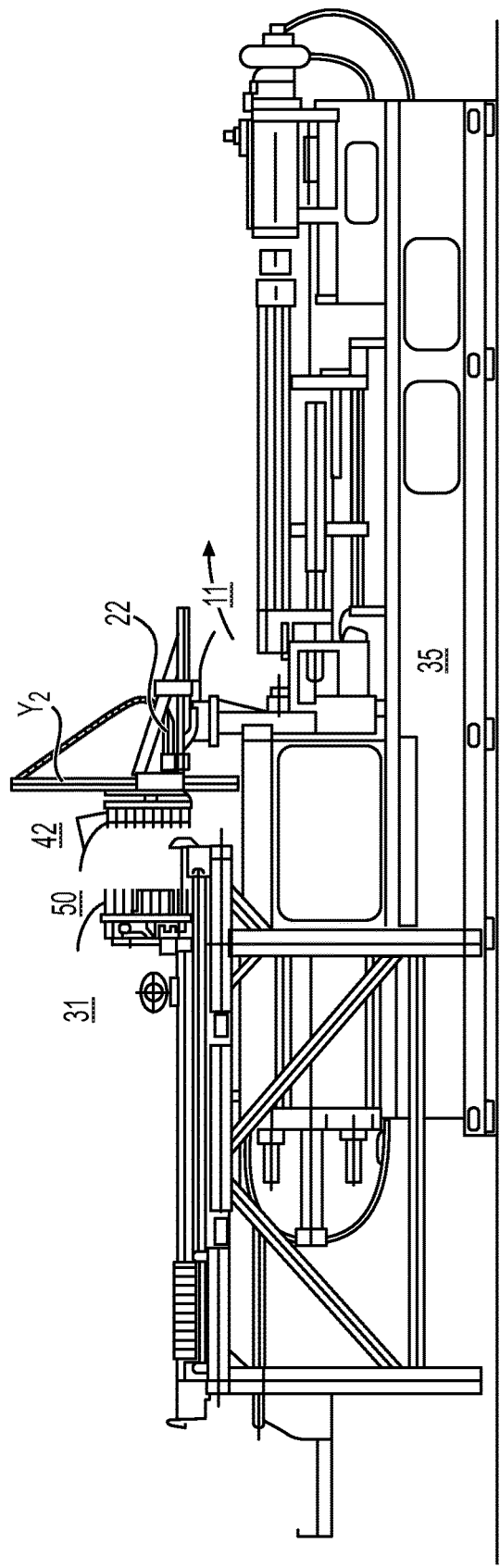
FIGS. 16-21, 22A, 22B, 23A and 23B each represent a view of the robot components.
Figure 17:
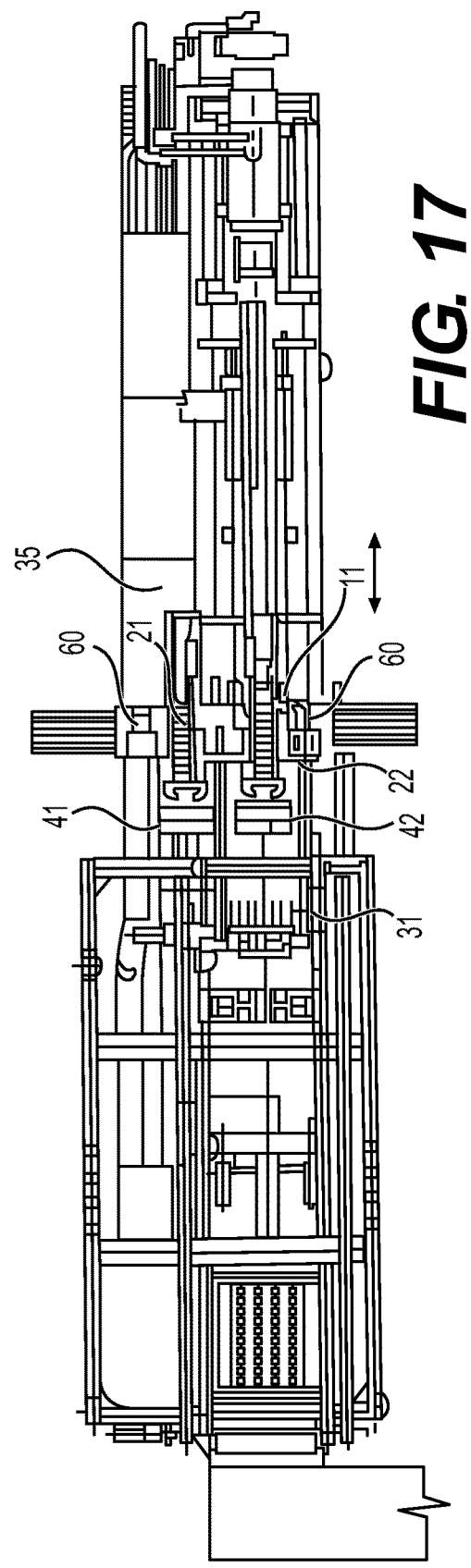
Figure 19:
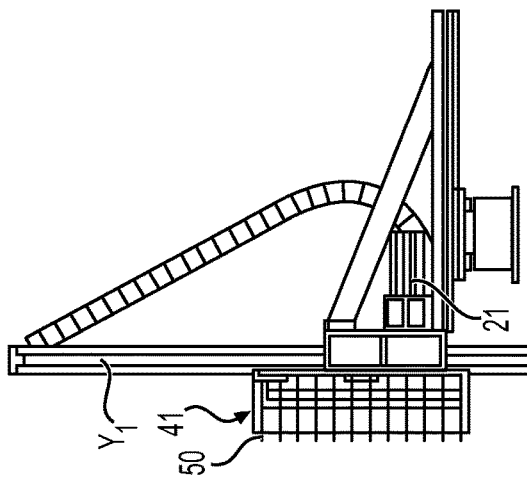
Figure 21:
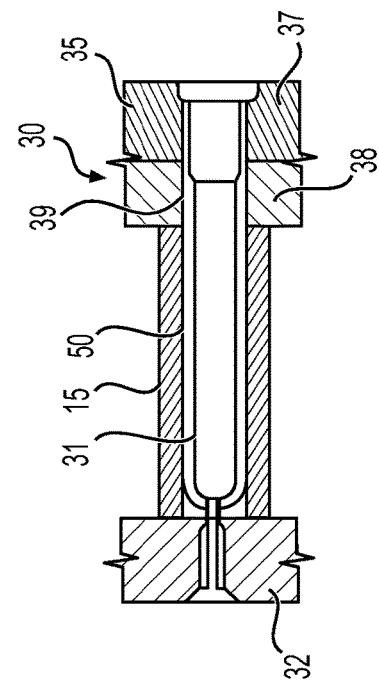
Figure 18:
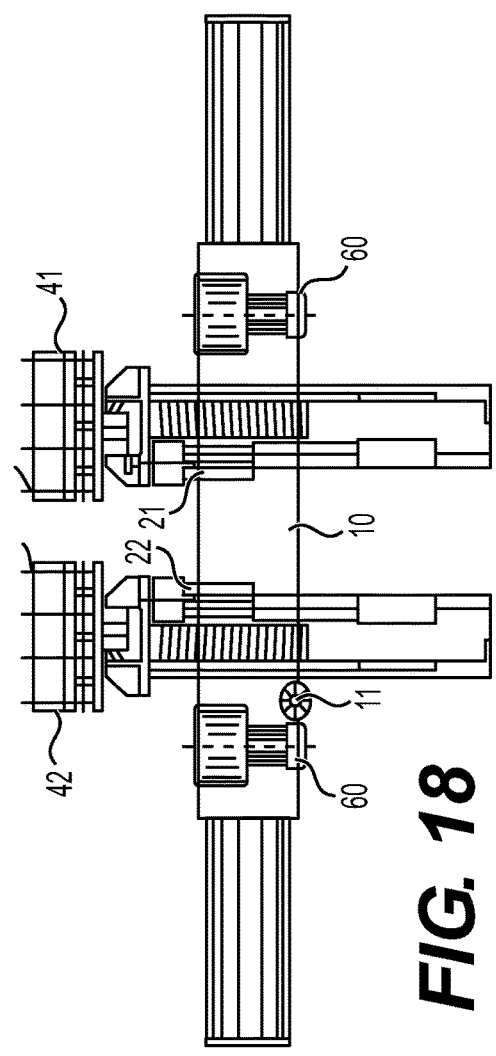
Figure 20:
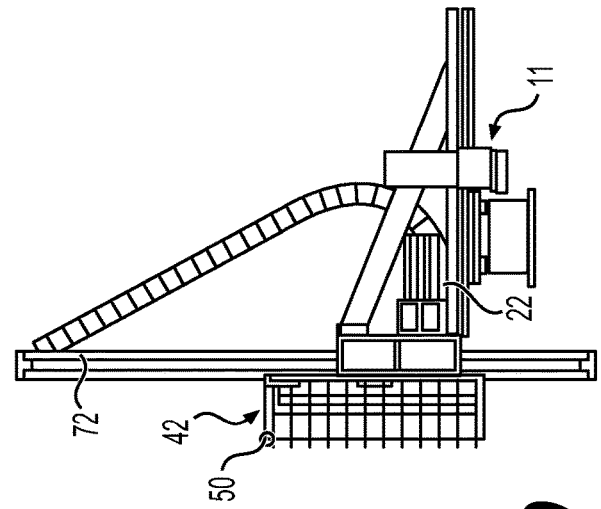
Figure 22A:
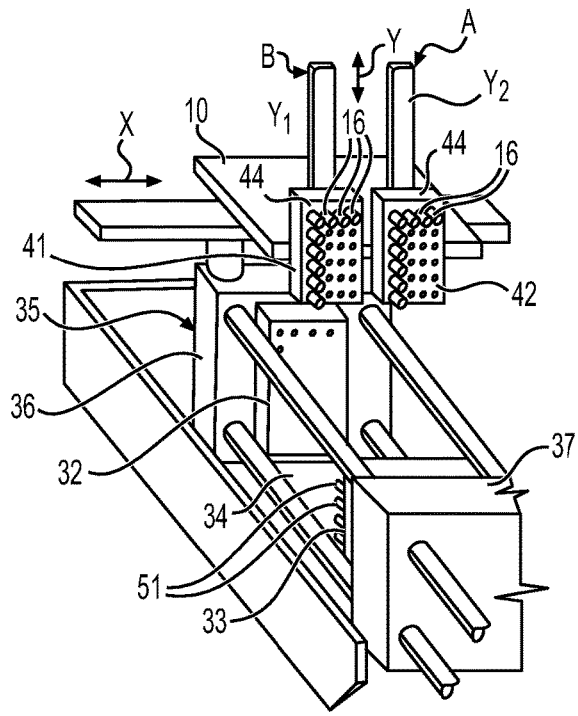
Figure 22B:
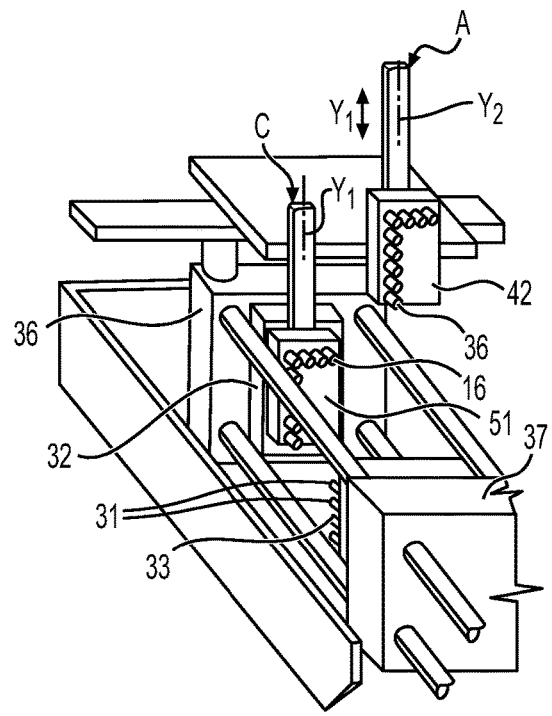
Figure 23A:
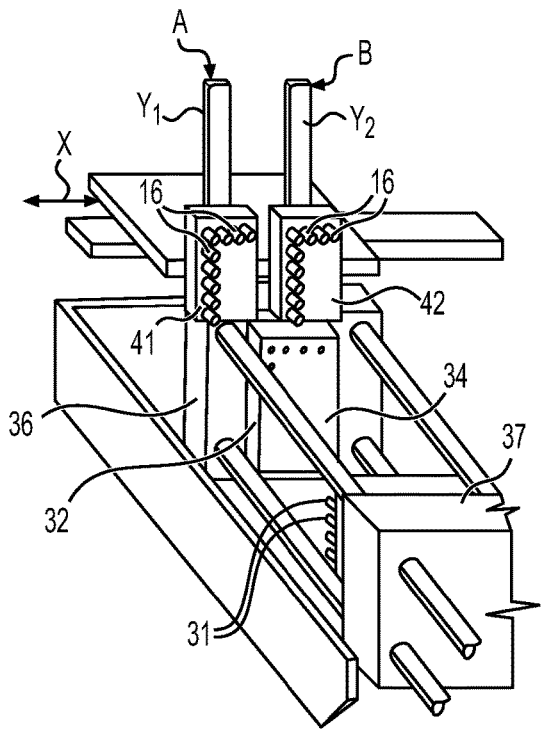
Figure 23B:
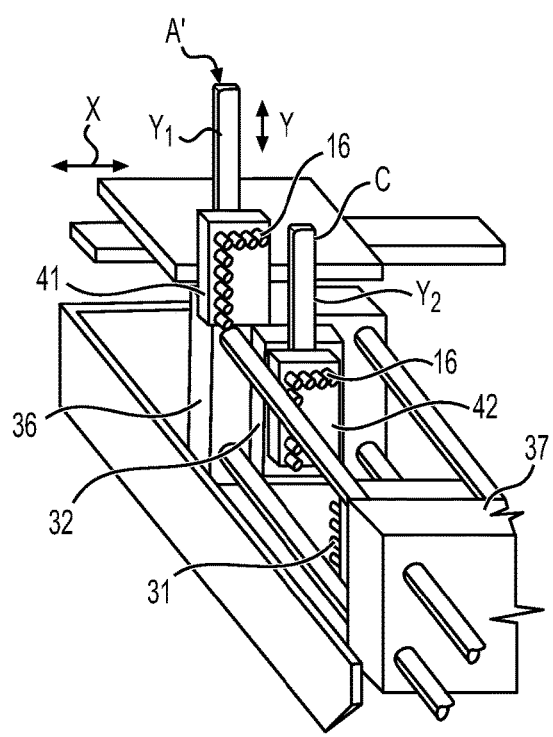
Figure 25:
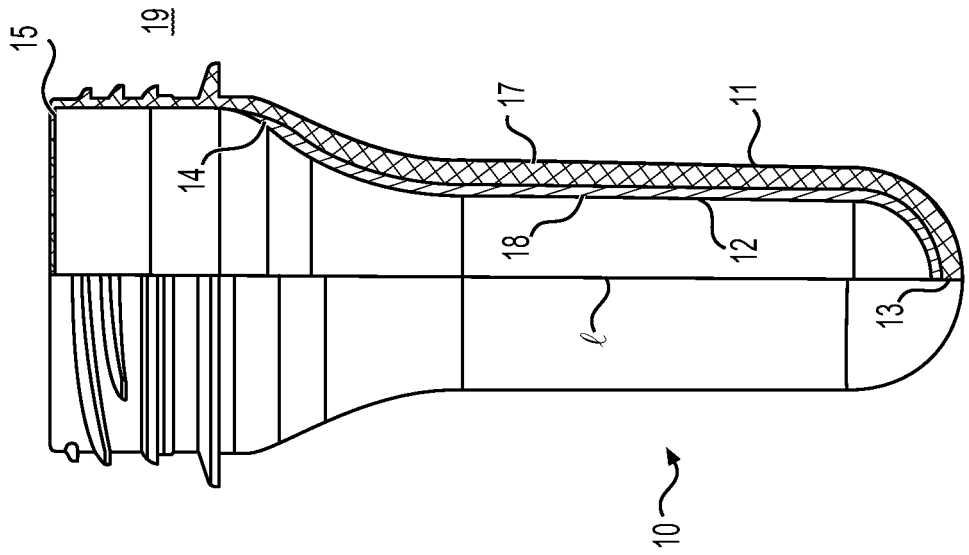
FIGS. 24 and 25 are a mixed representation of a composite preform according to the invention as a semi-finished product, especially obtained by applying the method as represented in FIG. 1.
Figure 24:
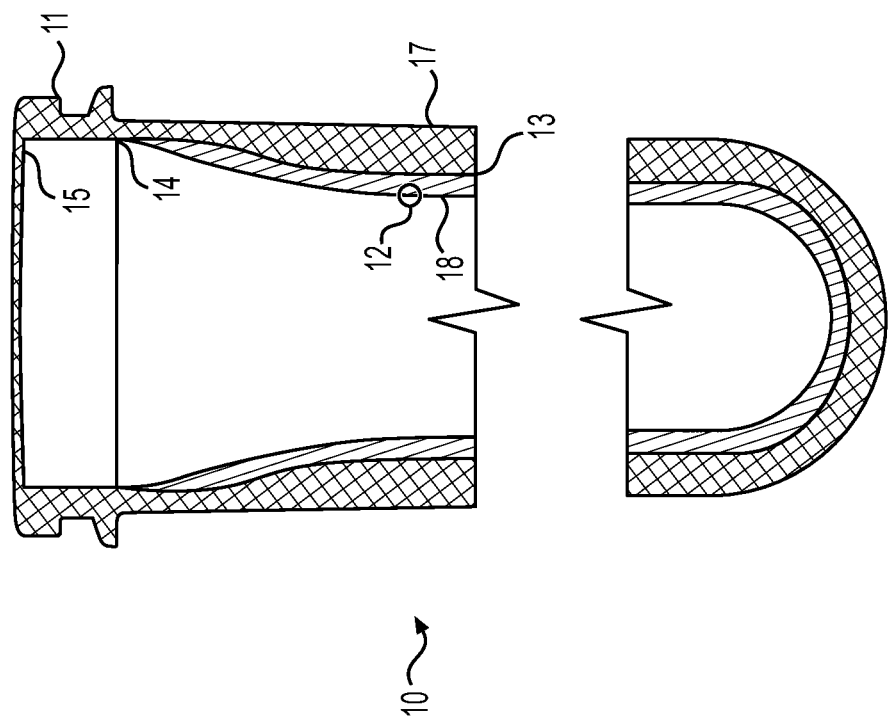
Figure 27:
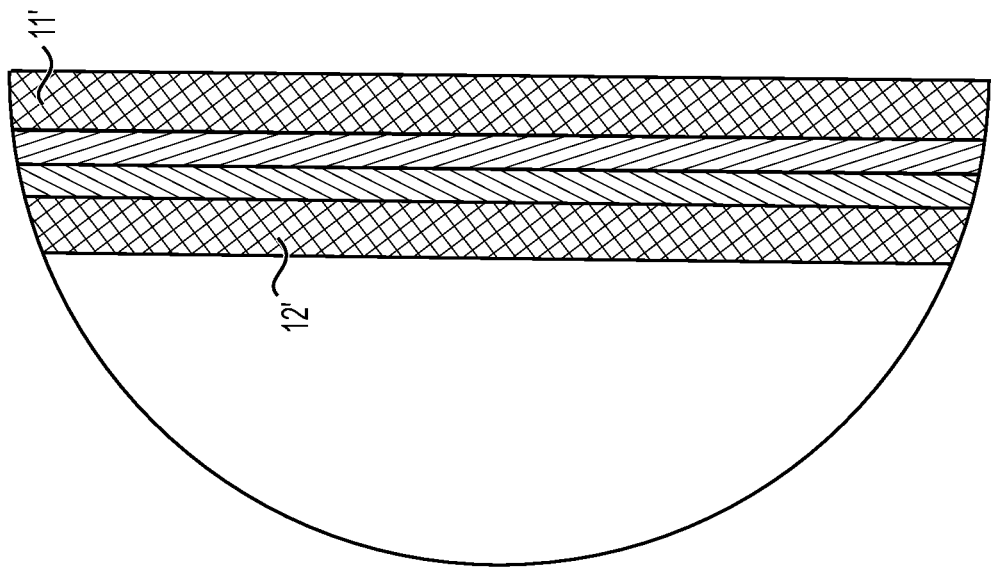
FIGS. 26 and 27 show a combined application of overmoulding and coating on a preform, resp. the wall section thereof.
Figure 26:
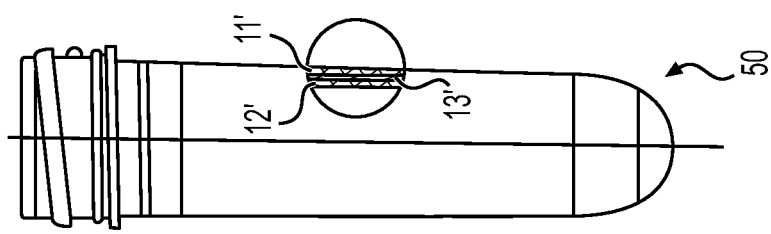
Figure 28A:
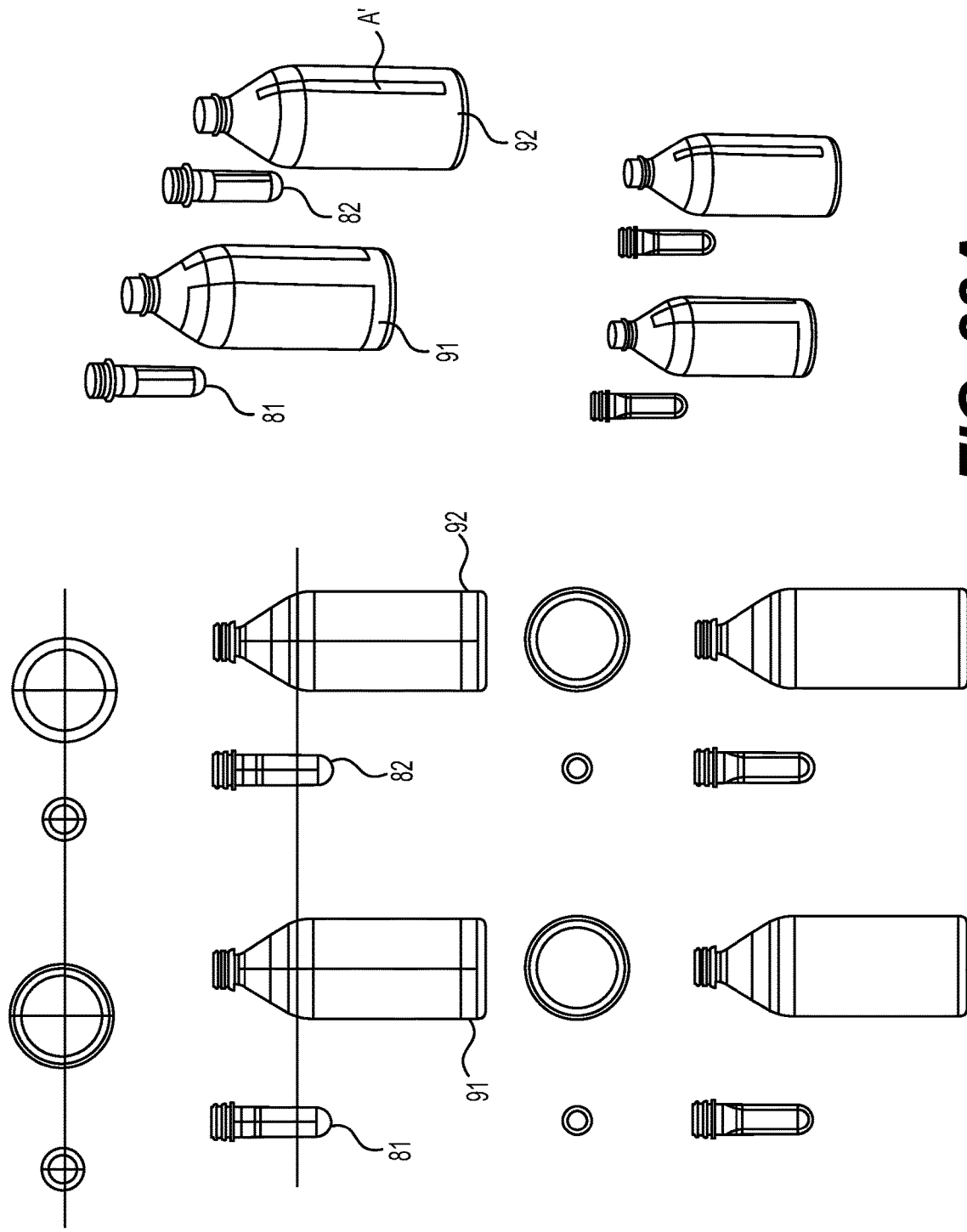
Figure 28B:
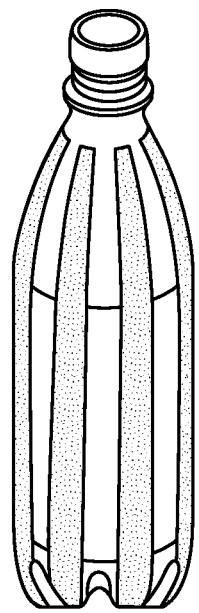
Figure 29:
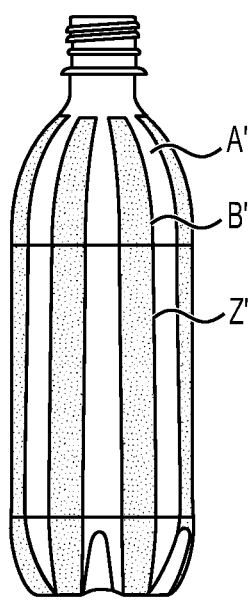
Figure 30:
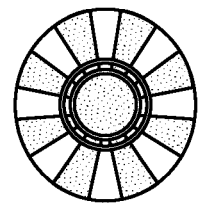
Figure 31:
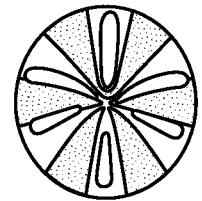
Figure 32:
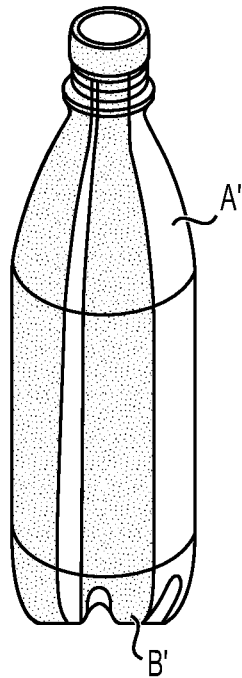
Figure 33:
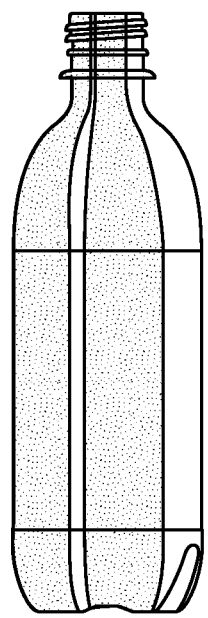
Figure 34:
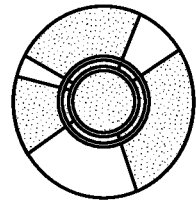
Figure 35:
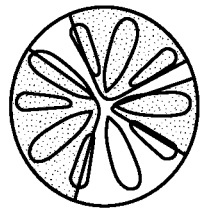

FIG. 8 is a schematic reproduction of the so formed finished product consisting of the aforementioned composite preform, in which the inner preform is accommodated.

In addition, FIG. 9 shows the third phase of the method, wherein the grab arm 4 with the vacuum plate 40, which was in the standby position, now receives all products from the cores 33.

FIG. 10 is a sectional representation along the line C-C in the previous FIG. showing a cross section, wherein the bottommost 32 products, being the inner preforms, have been transferred into the vacuum plate 40.

FIG. 11 schematically represents the fourth step of the method according to the invention, wherein the grab arm moves upwards with the vacuum plate with the injection moulded products. Here, the 32 bottommost products, being the inner preforms, are transferred onto the cores 33 of the 32 topmost composite preforms 10. Next, the topmost finished products are deposited onto a discharge conveyor 100.

In addition, FIG. 12 shows a cross section along the line G-G in the previous FIG., wherein the injection moulded inner preforms 12 are seated on the topmost cores 33.

The robot arm then moves further vertically, with the 32 topmost products, being the composite preforms, therein, wherein these are further expelled from the vacuum plate 40 and are thus ready for packing.

Once the robot arm 41 has disappeared from between the mould 3, the mould can reclose, just as in step 1. This is then ready to injection mould the following products, being 32 integrated preforms 10 at the top and 32 inner preforms 12 at the bottom.

The overmoulding method can be used to produce bicolour preforms. For this, the inner and outer preform 11 are sprayed a different colour, or only the inner or outer preform is coloured. As a result of selective recesses in the inner preform 12, certain specific designs and variations in colours can be obtained.

For example, an opaquely coloured inner preform, wherein in the longitudinal axis of the preform a complete recess is provided, and a transparent outer preform 11. This gives rise to a transparent window over the full length of the preform and bottle, whereby the fill level of the bottle can be observed.

As far as the addition of two different materials is concerned, the described method for the production of overmoulding preforms likewise allows the inner and the outer preform 11 to be injection moulded in another material. This can have special advantages for, for example, gas barrier, moisture barrier or hot-fill applications. The outer preform 11 can be produced from standard PET here, and the inner preform 12 can be produced from a high barrier or hot-fill material. If so desired, this allows the use of a higher share of secondary material for barrier applications compared with known multilayer preforms.

For hot-fill applications, wherein the complete bottle must standardly be made of expensive hot-fill material, the inner preform alone may consist of secondary material. For further applications, the inner preform could consist, for example, of a polyolefin, and the outer preform of PET. This bottle combines the mechanical and gas barrier properties of PET with the chemical barrier, moisture barrier and thermal properties of polyolefins.

Even though this can call for a longer vertical movement between the primary and secondary injection step, it does however ensure two completely separate hot runners for the primary and secondary material a, b. In addition to an extreme simplification of the hot runner systems, this ensures greater flexibility for the material, since the two hot runners can be set at mutually independent processing temperatures.

Examples of Insert-Overmoulding with Unitized Machine:

Insert-overmoulding preforms were produced on a dual-cavity 2K PET injection machine. The hot runner was mounted such that the A material can be injected individually into the topmost cavity and the B material can be injected individually into the bottommost cavity.

The cavities were mounted such that in the bottommost cavity an inner preform has been produced without screw thread, and in the topmost cavity an outer preform has been produced with PCO screw thread. In the topmost cavity a core having a diameter of 0.6 mm less than the core in the bottommost cavity has been placed.

The take-off robot was programmed such that, after one cycle, the preform has been taken off the bottommost core and placed on the topmost core, whilst the finished preform has been removed from the topmost core and subsequently cooled.

Materials

Test 1: In a first test, an overmoulding preform was produced, the inner layer was coloured blue in order to be able to visually evaluate both layers.

Weight of inner preform 6.2 g; total weight 25.8 g

A material (outer preform): PET, colourless.

B material (inner preform): PET, coloured blue.

From the produced preforms, bottles were blown and evaluated. Both layers were present in the expected ratio and there was good adhesion between the layers.

Test 2: In a second test, a milk preform having a highest possible light barrier was produced with overmoulding.

Weight of inner preform 6.5 g; total weight 26.3 g

A material (outer preform): coloured with 5% white dye.

B material (inner preform): coloured with 1% black dye.

From the produced preforms, bottles were blown and evaluated for light barrier with a spectrophotometer. The results indicated a markedly improved light barrier compared with only white coloured bottles.

The invention claimed is:

1. Method for manufacturing plastic hollow articles by injection moulding, comprising the following steps:
providing a mould (3) having a core side (31) and a cavity side (32), between which hollow articles (10) are formed, after which the mould (3) is opened into its two halves (31, 32), said mould (3) comprising multicavities with an even number of at least two sets of cavities (34) and cores (33), and wherein both sub-preforms (11) and (12) are injected at the same time, primary raw material is injected into a first area comprising one of the two sets of cavities and cores (33) of the mould (3) forming primary sub-preforms, secondary raw material is injected into a second area comprising another of the two sets of cavities and cores of the mould (3) forming secondary sub-preforms, the mould (3) is opened into its two halves (31, 32), and each of the cores (33) in the first area is a primary core adapted to bear a primary hollow article and each of the cores in the second area is a secondary core adapted to bear a secondary hollow article, composite preforms (10) are made as hollow articles comprising the primary and secondary sub-preforms (11, 12) and to be worked into plastic containers, wherein in a $1^{st}$ step ($\Phi 1$) the injection mould (3) containing the injected composite preform (10) and secondary sub-preform (12) is closed, and a gripping member (4) provided with a set of receiving members (16) is set in a standby position aside from the mould;

in a $2^{nd}$ step ($\Phi 2$) the forming mould (3) is opened and its cavity side (32) and core side (31), which are driven apart from each other, wherein each core in the first area (33) bears an injected composite preform (10), and respectively the secondary core in the second area (33') bears a secondary inner preform (12);

in a $3^{rd}$ step ($\Phi 3$), the gripping member (4) is set in motion, under the drive of a driving unit (5) according to a preset direction of movement between the set-aside standby position (A) and an active take-over operating position (B), which is directed to the core side (31) of the mould (3), wherein each composite preform (10) and each secondary inner preform (12) are cooled and are taken over from the core side (31) by the gripping member (4) by means of suction means (6), wherein the composite preform (10) and the secondary inner preform (12) are received in the corresponding receiving members (16);

in a $4^{th}$ step ($\Phi 4$), the gripping member (4) is further moved into a further operating position, in which it places the received secondary inner preforms (12) onto the respective primary cores (33) and continues to hold said primary preforms (11) in place, the mold is closed with the formation of each integrated composite preform (10) composed of the primary preform (11) on the secondary inner preform (12), the mold is opened, after which the gripping member (4) is moved back into the set-aside standby position (A) in order to expel the so produced integrated composite preforms (10) to a discharge unit for further treatment, whereby one full cycle (O) is thus completed and whereupon the forming mould (3) is then closed again, wherein insert overmoulding preforms (10) are produced on a dual cavity injection machine, wherein a hot-runner is mounted such that a first material (a) is injected individually in one of both cavities, notably an upper one (34) and a second material (b) is injected individually into the other cavity notably a lower one (34'), wherein the cavities are mounted such that in the lower cavity, an inner preform (12) is produced without a screw thread, and in said other cavity, an outer preform (11) is produced with a screw thread, wherein a core (33) is further disposed in the upper cavity with a diameter that is slightly smaller than the core (33') in the lower cavity, wherein the take-off robot gripping member (4) is programmed such that, after one cycle, the preform (11) is taken off from the lower core (33') and is placed on the upper core (33), while the finished preform (10) of the upper core (33) is removed and is recooled, wherein the primary and inner, secondary outer preform (11, 12) are injected in a different color, wherein only the inner or outer preform (11) or (12) is colored, wherein at least one selective recess (77) is made in the inner preform (12), through which certain specific aspects and variations (76) in colours of the final preform (10) are carried out, in particular by means of an opaquely coloured inner preform (12), more particularly wherein a complete longitudinal recess (77) is carried out along the longitudinal axis (l) of said inner preform (12), which is combined with a transparent outer preform (11), thereby yielding a transparent window (79) over the entire length of the preform (10) which is to be blown into a bottle (1), whereby the fill level (78) thereof becomes observable.

2. Method according to claim 1, wherein in said $3^{rd}$ step ($\Phi 3$) the one gripping member (4) is moved (H) up to between both mould halves (31, 32) from which it receives the composite and secondary preforms (10, 12) for producing in said $4^{th}$ step ($\Phi 4$) the integrated composite preform (10) by means of one overmoulding sequence of said $1^{st}$ step followed by said $2^{nd}$ step, said $3^{rd}$ step and said $4^{th}$ step, respectively ($\Phi 1$, $\Phi 2$, $\Phi 3$, $\Phi 4$), thereby accomplishing one cycle (O), yet starting again with a new set of simultaneously injected outer and inner preforms (11, 12), wherein the production process is restarted in loop (O) for a new cycle (O') of said $1^{st}$ step followed by said $2^{nd}$ step, said $3^{rd}$ step and said $4^{th}$ step respectively ($\Phi 1'$, $\Phi 2'$, $\Phi 3'$, $\Phi 4'$) in this prescribed order.

3. Method according to claim 1, wherein the injection molded composite and secondary inner preforms (11, 12) are received in a vacuum plate (40) provided on the gripping member (4), wherein the core side (31) forms the movable mould plate with a predetermined number of cores (33), and a corresponding number of secondary cores for the secondary inner preforms (12), each occupying substantially one half of the core side (31), wherein the opposite cavity side (32) forms the fixed side with a corresponding number of primary cavities (34) and a further set with a corresponding number of secondary cavities (34') for the secondary inner preforms (12), which occupy the other half of said cavity side (32), and/or wherein both primary respectively secondary sub-fields (I, II, III, IV) of each mould side (31, 32) are divided into an even number of equally occupied sub-fields of both mould plates (31; 32) being organized in a matrix pattern in an even number of rows and a predetermined number of columns respectively containing an equal number of elements, according to a regular quadratic arrangement grid of the elements (33, 34), an even number of cores (33) and cavities (34), wherein each said half (101, 101') of the core side (31) and side (32) is split according to a staggered occupancy per row (110, 111), column (120, 121), grouped plural in pairs or more.

4. Method according to claim 1, wherein in said $2^{nd}$ step ($\Phi_2$) the mould is opened, wherein the movable mould half (31) is removed in parallel respective the fixed mould half (32), wherein the top products (11) in the top half (101) form the outer preforms (11), and said secondary inner preforms (12) are received therein, with the formation of a finished product (10) by the combination in each case of a top (11) and bottom product, with a positive connection, wherein said bottom products in the bottom half (102) form said inner preforms, and/or wherein in said third step ($\Phi_3$) said gripping member (4) is moved downward vertically with its vacuum plate (40), from the standby position (A) or deflected idle mode, into the active take-up working position (B) between both mould halves (31, 32) aligned therewith and in which said integrated composite preforms (10) and said secondary preforms (11, 12) are transferred from the respectively primary and secondary cores (33, 33') to said vacuum plate (40), wherein in said fourth step ($\Phi_4$) said gripping member (4) is moved back in the opposite direction (-H), vertically upward into alignment with said composite preforms (10) and said secondary inner preforms (12), wherein the secondary inner preforms (12) are transferred on the primary top cores (33) at the primary top half;

and/or wherein said gripping member (4) is then moved further upward vertically, thereby containing said integrated composite preforms (10), wherein the latter preforms (10) are expelled from said vacuum plate (40) and are thus ready to be further discharged to said discharge means;

and/or wherein as soon as said gripping arm (4) is removed from between both mould halves (31, 32), said mould (3) is closed again.

5. Method according to claim 1, wherein at least one second gripping member (42, . . . ) is operated, which is moved under drive from a second or additional driving unit (52), wherein said gripping members (41, 42) are matched to each other for taking over and discharging the molded preforms mutually sequentially, alternately, or in mutual overlap, in parallel, wherein in a parallel operation of overmolding, several cycles (0, 0') are proceeded at the same time, under the action of yet one gripping member (41,42) per cycle, which are matched to each other with a mutual phase shift ($\tau$), wherein an integrated composite preform (10) is performed which consists of a primary preform (11) and secondary inner preform (12) respectively, with actually one overmolding sequence loop ($\Phi 1$, $\Phi 2$, $\Phi 3$, $\Phi 4$) per cycle (O$i$).

6. Method according to claim 5, wherein the gripping members (41, 42) are moved in a to-and-fro motion (G, -G) in a first direction of their respective longitudinal axes (Y1, Y2), wherein the gripping members (41, 42, . . . 4$i$) are initially arranged on top of the mould (3), and wherein their respective movement ($\Delta X1$, $\Delta X2$) relative to one another is shifted in time over ($\pi$), wherein said at least two gripping members (41, 42) are arranged on a carrier (9), in a set-up plane which is substantially perpendicular relative to the ground of the supporting surface and are shifted in said set-up plane in accordance with a second direction under the drive of a further driving unit (5$i$), between a standby position (A) in idle mode and a take-over position (B) in operation mode, wherein said at least two gripping members (41, 42) are moved successively in accordance with two mutually substantially orthogonal directions, wherein said first direction of movement is selected substantially vertically relative to the ground, and both of the gripping means are moved between said take-over position (B) and operation mode (C);

wherein the latter movement of the two gripping members (41, 42) is proceeded simultaneously in said second direction (X) in which said carrier plate (9) is moved under the drive of a further motor that forms the further driving unit (5$i$).

7. Method according to claim 5, wherein a first cooling time is set for cooling the injected preforms (11) in the cavity side (32), in that at the end of the set first cooling time the cavity side (32) and the core side (31) of the mold (3) are separated from each other, to a distance between them which is sufficient for the insertion of one of said gripping members (41, 42) into a space (39) thus formed between cavity side and core side, wherein the reception side (44) of said one gripper element is directed towards the core side (31), said one gripper element is moved from the disconnected position (B) to said space (34), and said one gripper element is thus taken into said working position (C) relative to the core side, and the preforms (11) are cooled there in the yet corresponding reception elements (16) during a second set cooling time, wherein after expiry of said cooling time the preforms are passed from the core side to said one gripper element each into a reception element (16) corresponding to each core (33), following which said one gripper element is moved back into the disconnected position (B), both gripper elements are shifted crosswise until the further gripper element is driven in the disconnected position (B) and the one gripper element in said standby position (A), after which the movement executed by said one gripper element during the completed cycle is then carried out in the same way by the further gripper element, and a further set of preforms (11) is thus taken over by the latter (42) from the core side of the mould (3), and said further gripper element is then driven back to the disconnected position (B).

8. Method according to claim 5, wherein during a first cycle (O1) said mould opens at the end of a first cooling time, wherein injected preforms (11) are resting on said core side (31), wherein as soon as a space (34) is formed between core side (31) and cavity side (32) which is large enough to place therein the first gripper element (41), with a reliable transfer of the preforms, said first gripper element (41) is moved by being driven by a motor forming said drive unit (5) along the longitudinal axis (Y1) of said first gripper element (41) between said core side and cavity side until it is in the working position (C), wherein said first gripper element (41) then takes over a complete first set of preforms (81) from the core side (31), wherein after the preforms have been transferred, said first gripper element (41) is driven back along said longitudinal axis (Y1) to the disconnected position (B) in which the preforms (11) are held in respective sleeves forming said reception elements (16) of said first gripping member (41) during a subsequent cycle (O2) which starts from the moment that said first gripping member (41)

is driven into said disconnected position (B), wherein the preforms (11) are accommodated in their respective sleeves (34'), where they are subjected to an appropriate cooling, whereby in the meantime the preforms of said first cycle (O1) are still present in said second gripping member (42), wherein shortly before the end of the subsequent cycle (O2) said second gripping member (42) is moved from the standby position (A) into the disconnected position (B), while said first gripper element (41) is moved to a standby position (A') with a similar takeover process being carried out with the second gripping member (42), wherein after said first gripper element (41) has reached the disconnected position, its preforms (11) are removed, and wherein the abovementioned steps are repeated for the next cycle (On) in a repeated process.

9. Method according to claim 7, wherein for the manufacture of overmolding preforms, two different materials (a, b) are added, wherein the inner and the outer preforms (12, 11) are injected in a different material, through which a blocking barrier (75), especially a gas barrier, moisture barrier or light barrier is incorporated in the final preform (10), wherein the outer preform (11) is made from standard PET, and the inner preform (12) from a high barrier or hotfill material, in the case of use for hotfill applications, when intended for containers for dairy products with a high light barrier, wherein the overmolding process hereby used consists of producing preforms, which begins with the injection molding of a gray inner layer, on which a $2^{nd}$ white layer is further overmoulded, which preform ensures the light barrier which is required for ultra-high temperature (UHT) milk bottles, wherein the inner preform is made from a material that is light-tight, or opaque, and a corresponding outer preform which is transparent or has a color, wherein the relevant milk bottle becomes white outside after blowing the combined overmolding preform (10), while being with a black or gray layer of plastic carried out as a light barrier at the inside.

10. Method according to claim 1, wherein a primary preform (11) is coated by a secondary preform being applied as a coating on at least a portion of the primary plastic preform in which the latter preform consists of at least one coating layer, wherein a primary preform made of plastic, more specifically from a particularly biaxially stretchable material, for use in the manufacture of a plastic container, is coated, wherein it is partly covered with a secondary preform as coating, with at least one coating layer consisting of a polymer coating applied to at least a portion of the primary plastic preform (11), wherein the coating (98) has a glass transition temperature value $T_G$ which is lower or equal to that of said stretchable material, wherein PET is selected as said stretchable material, wherein the coating has a glass transition temperature value $T_G$ which is lower or equal to that of PET, wherein a barrier coating (99) is applied on the preform (11), wherein said at least one coating layer (98) is provided on the outside of the preform, in particular in order to avoid contact of the coating (98) with foodstuffs.

* * * * *